Dec. 26, 1967     C. B. GWYN, JR     3,359,623
METHOD FOR MAKING REFRACTORY METAL CONTACTS
HAVING INTEGRAL WELDING SURFACES THEREON
Filed May 13, 1965
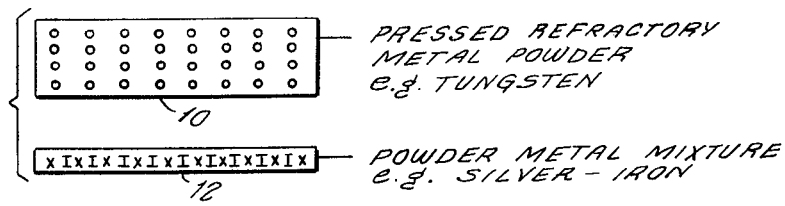
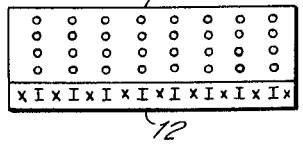
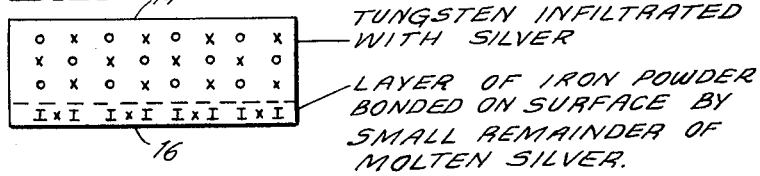
INVENTOR.
CHILDRESS B. GWYN, JR.
BY
OSTROLENK, FABER, GERB & SOFFEN
ATTORNEYS

United States Patent Office 3,359,623
Patented Dec. 26, 1967

3,359,623
METHOD FOR MAKING REFRACTORY METAL CONTACTS HAVING INTEGRAL WELDING SURFACES THEREON
Childress B. Gwyn, Jr., Export, Pa., assignor to Talon, Inc., Meadville, Pa., a corporation of Pennsylvania
Filed May 13, 1965, Ser. No. 455,439
5 Claims. (Cl. 29—420.5)

This invention relates to the manufacture of refractory metal contacts and, more particularly, to a method for simultaneously impregnating such a refractory metal contact element with a desirable additive material, and coating or cladding one or more sides of the refractory metal body with a facing of a non-alloying metal facilitating electrical welding or brazing of the contact to a supporting member.

Prior art techniques for producing refractory metal contacts suitable for electrical welding or brazing to associated supporting members have in general involved relatively complex operations requiring many, if not all, of the following steps:

(1) ball milling, or similar operational steps, to produce a homogeneous mixture of, for example, silver and tungsten metal powders;
(2) compacting the resulting mixture in oversized dies to compensate for shrinkage during subsequent sintering;
(3) sintering at a predetermined temperature for a predetermined time cycle;
(4) infiltrating by placing a suitable excess amount of silver in contact with the sintered and shrunken tungsten-silver powdered mixture, and subsequently effecting penetration of the excess silver into and throughout the previously sintered mixture by heating at a predetermined temperature for a predetermined time in a non-oxidizing atmosphere;
(5) blanking or otherwise forming suitably dimensioned disks or bodies comprised of a suitable brazing material;
(6) blanking or otherwise forming a backing disk comprised of a material such as nickel, iron etc., facilitating the operation of brazing or electrical welding of the final contact to an associated support;
(7) placing the previously prepared tungsten-silver body in a suitable fixture, positioning the brazing material body and the backing disc thereon;
(8) brazing to unify the silver-tungsten sintered metal body with the nickel or iron backing; and finally
(9) coining or re-coining the composite body to size the silver-tungsten body and form a projection or other desirable contour on the nickel or iron backing thereof.

Thus, from a manufacturer's viewpoint, a relatively costly and complex sequence of operations has heretofore been required to produce refractory metal contacts having integral welding or brazing surfaces provided thereon.

It is accordingly among the objects of the present invention to provide a method for producing refractory powder metal electrical contacts having integral welding or brazing surfaces thereon, which method substantially reduces the time and cost of manufacture of such contacts and does not require separate solder media for bonding weldable backings thereto.

Specifiically, the multiple fabrication steps employed in accordance with prior art procedures have been reduced, in accordance with the invention, to three, viz., the preparation of a pressed, refractory metal body, the preparation of a powder metal body, and the bonding of these bodies such that a portion of one constituent of the powder metal body impregnates the refractory metal body to effect bonding between the respective bodies, while a remaining portion of such constituent remains on the surface of the powder metal body to define an integral welding or brazing surface thereon. These steps may be effected, in accordance with the method hereof, with a minimum of material losses and without the use of separate solder media to bond the respective metal bodies.

These and other objects of the invention are achieved by bonding or brazing a pressed, refractory metal body constituted of (1) tungsten, molybdenum, mixtures of tungsten and molybdenum, binary alloys of tungsten and molybdenum, tungsten carbide, milybdenum carbide, and mixtures of such materials, alone or in admixture with (2) silver and/or copper or silver-cadmium, in an amount of up to 60% by weight of such body, with a powder metal body constituted of a mixture of (1) silver and/or copper in an amount of from 5 to 95% by weight of the mixture, and (2) iron, nickel or a nickel-copper alloy, in an amount of from 5 to 95% by weight of such mixture. The respective bodies are bonded by heating the same in abutting relation at temperatures of from about 1700° to 2500° F. for periods of from about 10 minutes to 24 hours. At least a portion of the silver or copper constituent of the powder metal body is thus impregnated into the refractory metal body to bond or braze the bodies to one another, a further portion of such constituent remaining on an exterior surface of the composite contact thus provided, to define a welding surface thereon.

Alternatively, the composite contact may be produced by compressing a composite body incorporating both the refractory metal and powder metal elements and thereafter permanently uniting such elements by the heat treatment specified hereinabove. Such single compact procedure is preferred over the dual compact procedure described above where variations in the thickness of the refractory metals are not critical and/or other increased dimensional tolerances are permissible. In other instances in which more exacting tolerances must be maintained, it is preferred to utilize the dual compact body procedure described in the preceding paragraph.

The method of the invention thus provides a convenient technique by which refractory powder metal electrical contacts having welding surfaces formed integrally therewith may be produced, without the necessity for separately brazing weldable backings to the refractory contacts.

The nature and objects of the invention will be more fully understood from reference to the following detailed description of a preferred embodiment of the method of the invention, taken in connection with the accompanying drawings, in which:

FIGURE 1 is a schematic cross-section of a refractory metal body and a non-alloying powder metal body employed in accordance with the present invention;

FIGURES 2 and 3 are further schematic sections similar to FIGURE 1, showing the components of FIGURE 1 as they appear in successive stages of the present method; and FIGURE 4 is a flow diagram illustrating the successive steps corresponding to the stages illustrated in FIGURES 1, 2 and 3, respectively.

Referring to FIGURE 1, a cross-section of a pressed refractory metal body 10 chosen, for example, in the shape of a disc, is illustrated. The "O" symbols shown in the figure (and in FIGURES 2 and 3) pictorially designate the refractory material which, as indicated above, comprises tungsten, molybdenum, mixtures of tungsten and molybdenum (which may, for example, contain from 5 to 95% tungsten and 5 to 95% molybdenum), binary alloys of tungsten and molybdenum (which may, for example, contain from 5 to 95% tungsten and from 5 to 95% molybdenum), tungsten carbide, molybdenum carbide, or mixtures of such materials. The refractory metal body may consist essentially of the indicated refractory materials or may, if desired, include up to about 60% by weight of a non-refractory material, viz., silver and/or copper or silver-cadmium. Since, as indicated hereinafter, the refractory metal body is subsequently impregnated with such a non-refractory material, it need not initially contain all or, in fact, any portion of such constituent, it sufficing that the product contact produced in accordance with the method hereof contains from about 10 to 90% by weight of the refractory metals and/or refractory metal carbides and from about 10 to 60% by weight of one or more of the aforesaid non-refractory materials.

The refractory body is suitably produced by pressing 80 to 400 mesh powders of the specified constituents to the desired shapes, employing conventional powder metal processing techniques. Suitably, the powders may be pressed in a Stokes Press at pressures of from about 1 to 40 tons per square inch. The pressed composition may thereafter be sintered in conventional manner or, if desired, may be simultaneously impregnated or infiltrated during sintering with some or all of the non-refractory metal constituent.

As shown in FIGURE 1, a powder metal body 12 is additionally provided, constituted of a mixture of non-alloying powder metal constituents. The first of such constituents is a relatively low melting metal capable of infiltrating the refractory metal body. Such constituent, which is pictorially designated in the drawing by the "X" symbols, comprises silver, copper, silver-copper mixtures, or silver-cadmium mixtures (preferably, those containing from 80% to 95% silver and from 5 to 20% cadmium). The second constituent of the powder metal body is a higher melting material which may be directly welded or brazed to a suitable supporting member for the contact. Such constituent, which is pictorially designated by the "I" symbols in the drawing, is suitably iron, nickel, or a nickel/copper alloy, e.g., "Monel" metal. Each of such constituents is incorporated in an amount of from about 5 to 95% by weight of the mixture of which the powder metal body is constituted. The refractory body 10 and the powder metal body 12 are bonded by heating the same in an inert atmosphere at temperatures of from about 1700° to 2500° F., preferably from 1700° to 2100° F., over time cycles varying from 10 minutes to 24 hours, preferably from about ⅙ to 1½ hours. The bonding is effected in a neutral or reducing atmosphere such as hydrogen, or in a vacuum.

It will be noted from a consideration of the symbolic representation of FIGURE 3 as compared with those of FIGURES 1 and 2, that bonding of bodies 10 and 12 simultaneously effects infiltration and/or impregnation of the low melting constituent of the powder metal body 12 into the refractory body 10. Hence, in the illustrative case in which the refractory body is initially constituted of tungsten and the powder metal body comprises a silver-iron powder metal mixture, a portion of the relatively low melting silver particles (designated by the "X" symbols) infiltrate the tungsten body and are diffused therethrough. A further portion of the silver particles, however, remains on the surface layer 16 of the composite element 14 thus produced. The silver particles remaining on surface 16 are sufficient to wet or bond the iron particles (designated by the "I" symbols) on such surface to a suitable support to which it may be desired to weld or braze the contact element.

The flow diagram illustrated in FIGURE 4 summarizes the sequential operations performed in FIGURES 1, 2 and 3, including the separate formation of the refractory metal and powder metal bodies, the disposition of such bodies in abutment with one another, and the simultaneous bonding and impregnation by which a composite refractory metal contact element is produced, which may be directly bonded to a suitable supporting member. The instant invention thus provides a novel method for producing refractory metal contacts having integral welding surfaces thereon, which method is markedly simpler to carry out than prior art procedures and which does not require the use of separate brazing media to secure independent refractory metal and backing segments to one another.

Alternatively, as indicated above, a single composite body corresponding to the separate abutting bodies illustrated in FIGURE 2 may be initially provided and thereafter subjected to the simultaneous bonding and impregnation steps described hereinabove. Such a single body may conveniently be prepared employing a suitable powder press equipped with a dual powder metal feed to alternately feed and simultaneously compact the principal refractory metal element and the powder metal backing element of the composite body.

It will be understood that these and other changes may be made in the preferred embodiments of the method hereof without departing from the scope of the present invention. Accordingly, it is intended that the preceding description is illustrative only and should not be construed in a limiting sense.

I claim:

1. A method for making a refractory powder metal electrical contact having an integral welding surface thereon, which comprises:
    (a) providing a pressed, refractory metal body constituted of:
        (1) a refractory material selected from the group consisting of tungsten, molybdenum, mixtures of tungsten and molybdenum, binary alloys of tungsten and molybdenum, tungsten carbide, molybdenum carbide, and mixtures of such materials, and
        (2) a non-refractory material selected from the group consisting of silver, copper, silver-copper mixtures and silver-cadmium mixtures in an amount of up to 60% by weight of the refractory metal body;
    (b) disposing a powder metal body in abutting relation to said pressed, refractory metal body, the powder metal body being constituted of a mixture of:
        (1) a first metal selected from the group consisting of silver, copper and mixtures thereof, in an amount of from 5–95% by weight of said mixture, and
        (2) a second metal selected from the group consisting of iron, nickel and nickel-copper alloys, in an amount of from 5–95% by weight of said mixture;
    (c) heating the abutting bodies at temperatures of from 1700° to 2500° F. for a period of from 10 minutes to 24 hours to impregnate at least a portion of the first metal constituent of said powder metal body into the refractory metal body and simultaneously bond said bodies to one another, at least a portion of said first metal remaining at an exterior surface of the composite contact thus provided to define a welding surface thereon.

2. The method as defined in claim 1, in which the resulting composite contact body is constituted of from 10–60% by weight of said non-refractory material, and from 10–90% by weight of said refractory material.

3. The method as defined in claim 1, in which the heating step (c) is conducted in a non-oxidizing atmosphere.

4. A method for making a refractory powder metal electrical contact having an integral welding surface thereon, which comprises:
    (a) providing a pressed, refractory metal body constituted of tungsten and silver, the latter being incorporated in an amount of up to 45% by weight of the body;
    (b) disposing a powder metal body in abutting relation to said pressed, refractory metal body, the powder metal body being constituted of a mixture of silver, in an amount of from 5 to 95% by weight of the powder metal body, and iron, in an amount of from 5 to 95% by weight of the powder metal body; and (c) heating the abutting bodies at temperatures of from 1700° to 2500° F. for a period of from 10 minutes to 24 hours to impregnate at least a portion of the silver constituent of said powder metal body into the refractory metal body and simultaneously bond said bodies to one another, at least a portion of said silver remaining on an exterior surface of the composite contact thus provided to define a welding surface thereon.

5. A method for making a refractory powder metal electrical contact having an integral welding surface thereon, which comprises:

(a) providing a pressed composite powder metal contact constituted of:
   (1) a refractory metal element comprising a refractory material selected from the group consisting of tungsten, molybdenum, mixtures of tungsten and molybdenum, binary alloys of tungsten and molybdenum, tungsten carbide, molybdenum carbide, and mixtures of such materials and, in an amount of up to 60% by weight of said refractory metal element, a nonrefractory material selected from the group consisting of silver, copper, silver-copper mixtures and silver-cadmium mixtures, and
   (2) a powder metal element constituted of a mixture of a first metal selected from the group consisting of silver, copper and mixtures thereof, in an amount of from 5–95% by weight of said mixture, and a second metal selected from the group consisting of iron, nickel and nickel-copper alloys, in an amount of from 5–95% by weight of said mixture;

(b) heating the composite powder metal contact at temperatures of from 1700° to 2500° F. for a period of from 10 minutes to 24 hours to impregnate at least a portion of the first metal constituent of said powder metal element into the refractory metal element and simultaneously permanently uniting said elements to one another, at least a portion of said first metal constituent remaining at an exterior surface of the composite contact to define a welding surface thereon.

References Cited
UNITED STATES PATENTS

| | | | |
|---|---|---|---|
| 2,817,601 | 12/1957 | Shigley | 75—200 X |
| 2,851,381 | 9/1958 | Hoyer | 75—200 X |
| 3,120,436 | 2/1964 | Harrison | 75—200 |
| 3,285,714 | 11/1966 | Davies et al. | 75—208 X |
| 3,303,559 | 2/1967 | Hoctzclaw | 75—200 X |

JOHN F. CAMPBELL, *Primary Examiner.*

P. M. COHEN, *Assistant Examiner.*